United States Patent [19]
Caldwell

[11] Patent Number: 5,293,837
[45] Date of Patent: Mar. 15, 1994

[54] LITTER BOX HAVING SHELF FORMED IN SIDE WALL THEREOF SUPPORTING FINE AND COARSE GRID ASSEMBLY

[76] Inventor: J. Dean Caldwell, 122-2 S. Main, Minot, N. Dak. 58701

[21] Appl. No.: 59,677

[22] Filed: May 12, 1993

[51] Int. Cl.⁵ .............................................. A01K 23/00
[52] U.S. Cl. ..................................... 119/166; 209/373
[58] Field of Search ............... 119/166, 167, 165, 168; 209/352, 353, 354, 355, 356, 373

[56] References Cited

U.S. PATENT DOCUMENTS

| | | | |
|---|---|---|---|
| 2,963,003 | 12/1960 | Oberg et al. | 119/166 |
| 3,332,397 | 7/1967 | Vander Wall | 119/166 |
| 3,482,546 | 12/1969 | Anderson | 119/1 |
| 3,581,977 | 6/1971 | Kirsky et al. | 119/168 |
| 3,796,188 | 3/1974 | Bradstreet | 119/1 |
| 4,164,314 | 8/1979 | Edgar | 119/168 |
| 4,190,525 | 2/1980 | Menzel | 119/166 |
| 4,716,853 | 1/1988 | d'Aniello | 119/165 |
| 4,802,442 | 2/1989 | Wilson | 119/1 |
| 4,972,800 | 11/1990 | Bennett et al. | 119/166 |
| 5,012,765 | 5/1991 | Naso et al. | 119/166 |

*Primary Examiner*—Gene Mancene
*Assistant Examiner*—Todd E. Manahan
*Attorney, Agent, or Firm*—Jacobson, Price, Holman & Stern

[57] ABSTRACT

A generally rectangular upwardly opening receptacle is constructed of plastic and includes side and end walls incorporating transversely thickened zones thereof in horizontal registry with each other and defining a reinforcing belt extending peripherally about said receptacle along lower portions of the side and end walls thereof. The side and end wall portions disposed beneath the reinforcing belt are inwardly offset relative to the remaining upper portions of the side and end walls and define a horizontal inwardly projecting shelf extending about the interior of the receptacle upon which a grid assembly is supported, the grid assembly incorporating a first weight supporting lower first grid and a second finer grid overlying and supported from the coarse grid. The coarse grid includes downwardly projecting center abutment structure supported therefrom for abutting and support from a central area of the bottom wall of the receptacle and one side wall of the receptacle includes an upwardly opening entrance notch formed therein whose lower margin is substantially horizontally registered with the grid assembly.

10 Claims, 1 Drawing Sheet

LITTER BOX HAVING SHELF FORMED IN SIDE WALL THEREOF SUPPORTING FINE AND COARSE GRID ASSEMBLY

BACKGROUND OF THE INVENTION

1. Field of the Invention

This invention relates to a litter box for use by dogs, but which is modified in construction and operation relative to a cat litter box in that the dog litter box includes litter supported from the bottom wall thereof and further a animal weight supporting grid construction removably mounted in a lower portion of the interior of the box a spaced distance above the litter, at least one upstanding wall of the box having an upwardly opening entranceway notch formed therein whose lower margin is substantially flush with the upper surface of the grid construction.

2. Description of Related Art

Various different forms of litter boxes including some of the general structural and operational features of the instant invention heretofore have been provided. Examples of these previously known forms of litter boxes are disclosed in U.S. Pat. Nos. 3,482,546, 3,796,188, 4,242,763, 4,802,442 and 5,012,765. However, these previously known devices do not include the overall combination of structural and operational features of the instant invention.

SUMMARY OF THE INVENTION

The litter box of the instant invention has been specifically designed for use by dogs and not by cats. The litter box includes a bottom wall upon which granular litter of any conventional type may be placed, but a dog weight supporting grid is removably mounted within the box a spaced distance above the litter and includes a two part grid with a first part including vertically elongated, edge upstanding crossed and interconnected grid members for forming a weight supporting member with the grid members thereof spaced a reasonable distance apart and the second grid member comprises a finer panel-like grid member removably disposed over the first mentioned grid member, whereby the finer grid member will be comfortable to be walked upon by dogs using the litter box and the coarser grid member underlying the finer grid member is sufficient in strength to support the weight of the dog.

The main object of this invention is to provide a litter box specifically designed to be used by dogs of varying sizes.

Another object of this invention is to provide a litter box including a dog weight supporting screen or grid assembly mounted within the box above the litter resting upon the bottom of the box with the litter being adapted to receive and absorb liquid waste flowing through the screen or grid assembly and the latter being adapted to support, separately from the liquid waste, solid waste.

Another important object of this invention is to provide a litter box in accordance with the preceding objects and whose screen or grid assembly incorporates a lower coarse grid of edge upstanding crossed and interconnected strips for supporting the weight of the associated dog and an upper fine panel-like grid directly overlying and supported from the coarse lower grid and over which the pads of a dog may move comfortably.

A further object of this invention is to provide a screen or grid assembly in accordance with the immediately preceding object and wherein the lower coarse grid includes remote marginal handles which project upwardly therefrom and are received through openings provided therefore in the upper fine grid, whereby both the lower coarse grid and upper fine grid may be simultaneously removed for cleaning and emptying of the litter from the litter box therebeneath.

Another important object of this invention is to provide a screen or grid assembly in accordance with the preceding objects and wherein the lower coarse grid is provided with a central downwardly projecting abutment for abutment with and support from the upper surface of the bottom wall of the associated litter box.

A final object of this invention to be specifically enumerated herein is to provide a dog letter box in accordance with the preceding objects and which will conform to conventional forms of manufacture, be of simple construction and easy to use so to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
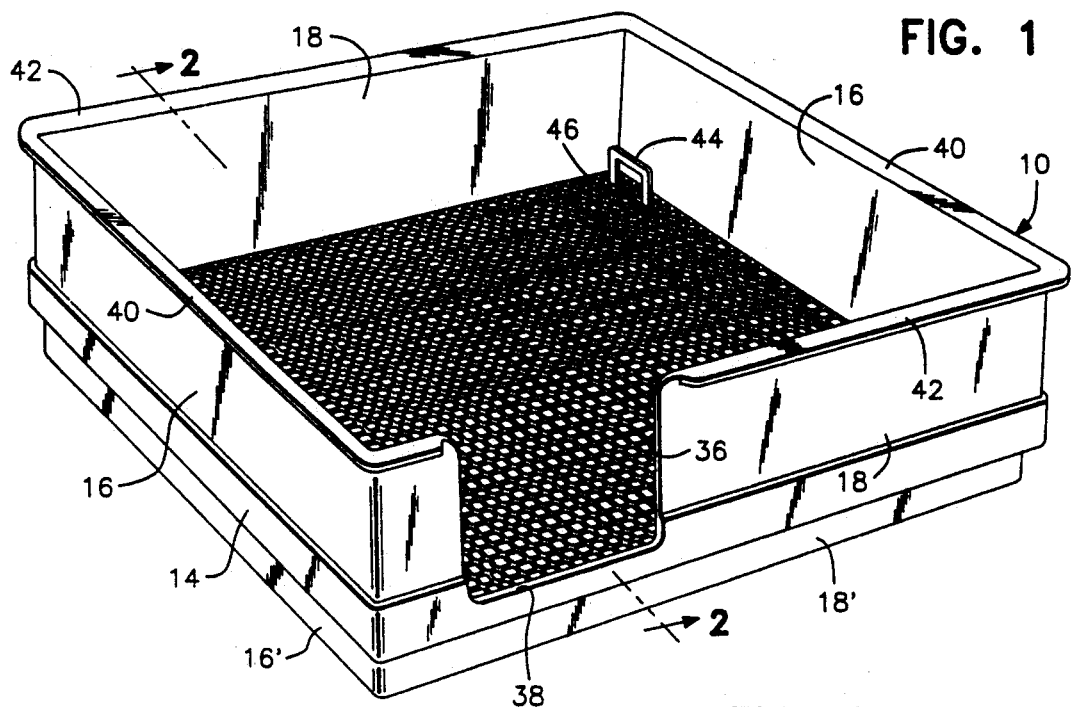
FIG. 1 is a perspective view of a litter box constructed in accordance with the present invention.
Figure 2:
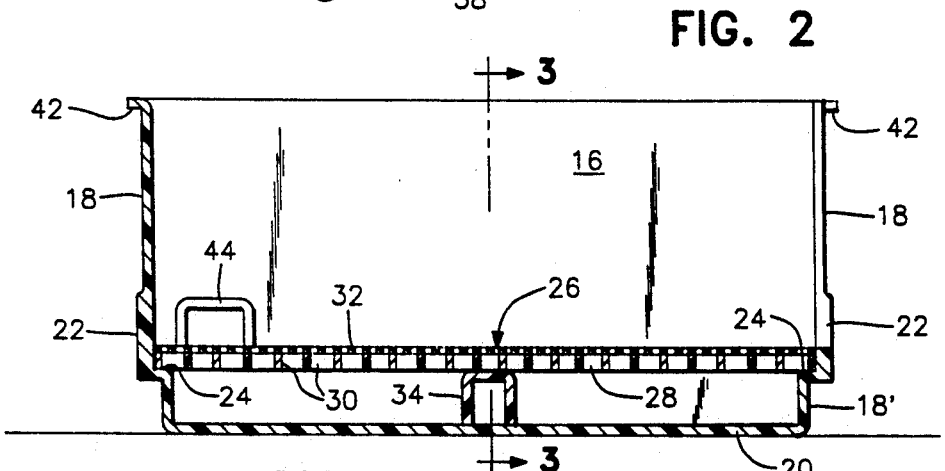
FIG. 2 is an enlarged fragmentary transverse vertical sectional view taken substantially upon the plane indicated by the section line 2—2 of FIG. 1.
Figure 3:
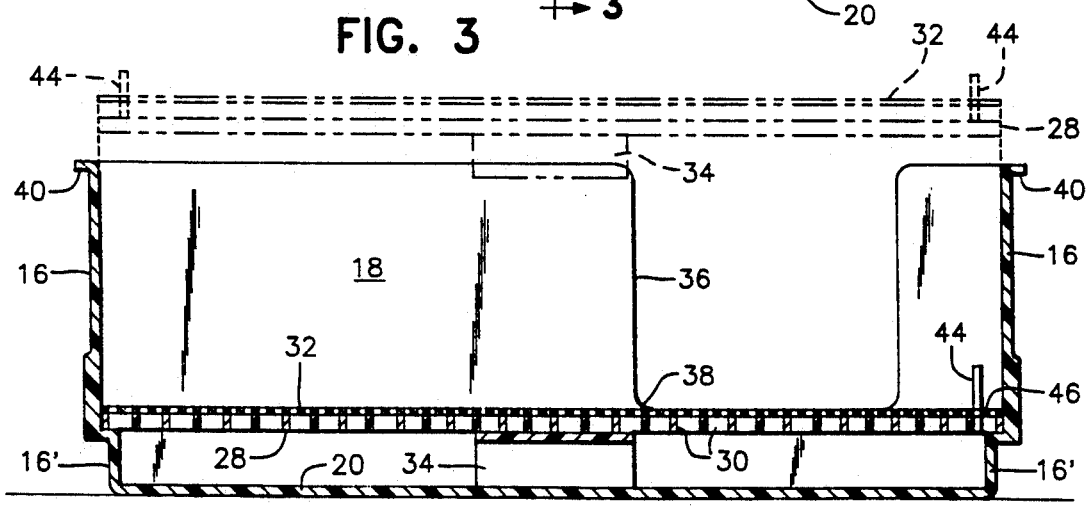
FIG. 3 is an enlarged longitudinal vertical sectional view taken substantially upon the plane indicated by the section line 3—3 of FIG. 3 and illustrating a partially removed portion of the screen or grid assembly in phantom lines.

Referring now more specifically to the drawings the numeral 10 generally designates the litter box of the instant invention. The litter box 10 comprises an open top receptacle 14 including peripherally continuous upstanding opposite end and side walls 16 and 18 interconnected at their lower margins by means of an integral bottom wall 20 extending therebetween.

The lower portions of the end and side walls 16 and 18 include transversely thicken areas 22 thereof which terminate downwardly in horizontally inwardly projecting shelf portions 24, the lower marginal portions 16' and 18' of the end walls 16 and 18 being inwardly offset relative to those portions of the walls 16 and 18 disposed thereabove.

Accordingly, the upper portions of the end and side walls 16 and 18 disposed above the shelf portions 24 are outwardly offset relative to the lower marginal portions 16' and 18'.

A grid assembly referred to in general by the reference numeral 26 is provided and is snugly downwardly received within the confines of the upper portions of the end and side walls 16 and 18 and rests upon the peripherally continuous shelf defined by the shelf portions 24. The grid assembly 26 incorporates a first coarse grid 28 of crossed and interconnected edge upstanding strips 30 and a second panel like finer grid 32. The grids 28 and 32 may be constructed of plastic of any suitable type, the receptacle 14 also being constructed of plastic, and the first coarse grid 28 includes a downwardly opening channel member 34 formed integrally therewith or secured to the underside thereof in a central area of the first coarse grid 28. The marginal portions of the grid assembly 26 are supported from the shelf portions 24 and the inverted channel member 34 comprises an abutment member which extends downwardly toward and rests against the upper surface of the bottom wall 20 for support therefrom.

One of the side walls 18 includes an upwardly opening U-shaped entranceway or notch 36 formed therein with the lower margin 38 of the notch 36 substantially horizontally aligned with the upper surface of the second finer grid 32. In addition, the upper margins of the end and side walls 16 and 18 include outwardly directed reinforcing flanges 40 and 42, respectively. However, the reinforcing flange 42 carried by the upper margin of the side wall 18 in which the notch 36 is formed terminates at the vertical edge of the notch 36.

Diagonally remote corner portions of the first coarse grid 28 include downwardly opening U-shaped handles 44 which project upwardly from the coarse grid 28 and are received through slots 46 provided therefore in the second finer grid 32. In this manner, the entire grid assembly 26 may be raised and removed from within the receptacle 14 by grasping and lifting up on the handles 44.

It is to be noted that the two part grid assembly 26 serves an important aspect of the invention in that the first coarse grid 28 provides the necessary strength to support the weight of a dog thereon while the second finer grid 32 is comfortable to the pads of a dog standing thereon. In addition, the transversely thickened areas 22 comprise another important aspect of the invention in that the end and side walls 16 and 18 are provided with a reinforcing belt extending thereabout immediately above the continuous shelf defined by the shelf portions 24, thereby strongly resisting any tendency for the end and side walls of the receptacle 14 to spread outwardly due to the weight of a dog being supported from the grid assembly 26. In addition, the inverted channel member 34 also functions to maintain the grid assembly 26 in a substantially planar position even though it may be supporting a reasonable weight and these features combined together to insure that the grid assembly 26 will remain in position upon the shelf defined by the shelf portions 24.

The interior of the receptacle 14 below the shelf portions 24 may be at least substantially filled with odor reducing litter and it is deemed readily apparent that the liquid waste will be retained separate from the solid waste and, therefore, that the solid waste and dampened litter may be separately disposed of, if desired when cleaning the litter box 10.

It also is reasonably important that the abutment member 34 comprises a channel member. For this reason, the opposite side flanges of the channel member 34 may readily downwardly penetrate a layer of clean litter supported on the bottom wall 20 and still provide a reasonably great contact area between the lower marginal edges of the side walls of the channel member 34 with the bottom 20 over which to support the weight of the grid assembly 26 and a relatively heavy dog standing thereon.

The foregoing is considered as illustrative only of the principles of the invention. Further, since numerous modifications and changes readily will occur to those skilled in the art, it is not desired to limit the invention to the exact construction and operation shown and described, and, accordingly all suitable modifications and equivalents may be resorted to, falling within the scope of the invention.

What is claimed as new is as follows:

1. A litter box for dogs, said box comprising an open top receptacle including peripherally continuous upstanding wall means having first height upper portions and lesser height lower portions and whose lower portions are interconnected by a bottom wall extending and secured between said lesser height lower portions of said wall means, said first height upper portions being outwardly offset relative to said lesser height lower portions with said receptacle defining an upwardly facing, generally horizontal shelf interconnecting corresponding upper and lower portions of said wall means, a first horizontal weight supporting coarse grid incorporating crossed, edge upstanding strips removably downwardly received within said receptacle and including major peripheral portions thereof removably supported from said shelf, and a second horizontal finer grid of considerably less vertical thickness than said first grid overlying and removably supported from said first gird, one portion of said side wall means including an upwardly opening entranceway notch formed therein opening upwardly through the upper margin of said one portion of said side wall means above said shelf, opposite marginal portions of said coarse grid including upwardly projecting handles for manually lifting said coarse grid and said finer grid from within said receptacle, said finer grid including openings formed therethrough upwardly through which said handles project.

2. The litter box of claim 1 wherein the central area of said coarse grid includes a depending abutment abuttingly engaged with a central area of said bottom wall.

3. The litter box of claim 1 wherein said handles comprise inverted U-shaped handles.

4. A litter box for dogs, said box comprising an open top receptacle including peripherally continuous upstanding wall means having first height upper portions and lesser height lower portions and whose lower portions are interconnected by a bottom wall extending and secured between said lesser height lower portions of said wall means, said first height upper portions being outwardly offset relative to said lesser height lower portions with said receptacle defining an upwardly facing, generally horizontal shelf interconnecting corresponding upper and lower portions of said wall means, a horizontal weight supporting grid assembly removably downwardly received within said receptacle and including major peripheral portions thereof removably supported from said shelf, one portion of said side wall means including an upwardly opening entranceway notch formed therein opening upwardly through the upper margin of said one portion of said side wall means above said shelf, said first height upper portions including an outwardly projecting thickened peripheral portion extending thereabout immediately above said shelf.

5. A litter box of claim 4 wherein said receptacle is constructed of plastic.

6. A litter box for dogs, said box comprising an open top receptacle including peripherally continuous upstanding wall means having first height upper portions and lesser height lower portions and whose lower portions are interconnected by a bottom wall extending and secured between said lesser height lower portions of said wall means, said first height upper portions being outwardly offset relative to said lesser height lower portions with said receptacle defining an upwardly facing, generally horizontal shelf interconnecting corresponding upper and lower portions of said wall means, a first horizontal weight supporting coarse grid incorporating crossed, edge upstanding strips removably downwardly received within said receptacle and including major peripheral portions thereof removably supported from said shelf, and a second horizontal finer grid of considerably less vertical thickness than said first grid overlying and removably supported from said first grid, one portion of said side wall means including an upwardly opening entranceway notch formed therein opening upwardly through the upper margin of said one portion of said side wall means above said shelf, said first height upper portions including an outwardly projecting thickened peripheral portion extending thereabout immediately above said shelf, opposite marginal portions of said coarse grid including upwardly projecting handles for manually lifting said coarse grid and said finer grid from within said receptacle, said finer grid including openings formed therethrough upwardly through which said handles project, said handles being disposed adjacent, closely inward of and generally paralleling opposite portions of said side wall means of said receptacle.

7. The litter box of claim 6 wherein said receptacle is generally rectangular in plan shape including pairs of long and short side and end walls, said notch being formed in one of said side walls.

8. The litter box of claim 6 wherein said first height upper portions include an outwardly projecting thickened peripheral potion extending thereabout immediately above said shelf.

9. The litter box of claim 8 wherein the central area of said coarse grid includes a depending abutment abuttingly engaged with a central area of said bottom wall.

10. The litter box of claim 9 wherein side wall upper portions includes upper margins including horizontally outwardly directed reinforcing flanges.

* * * * *